United States Patent [19]

Schiff

[11] 4,308,559

[45] Dec. 29, 1981

[54] SWITCHING APPARATUS FOR CLOSED CIRCUIT TELEVISION MONITORING SYSTEMS

[76] Inventor: Peter Schiff, Box 354, Rte. 7, Cookeville, Tenn. 38501

[21] Appl. No.: 38,578

[22] Filed: May 14, 1979

[51] Int. Cl.$^3$ .............................................. H04N 5/22
[52] U.S. Cl. ................................... 358/181; 358/108; 358/185
[58] Field of Search ...................... 358/108, 181, 185; 340/691, 541

[56] References Cited

U.S. PATENT DOCUMENTS

| | | | |
|---|---|---|---|
| 3,900,705 | 8/1975 | Richter | 358/181 |
| 4,037,250 | 7/1977 | McGahan et al. | 358/181 |
| 4,104,678 | 8/1978 | Van Roessel | 358/181 |
| 4,191,971 | 3/1980 | Dischert et al. | 358/181 |
| 4,218,709 | 8/1980 | Baxter et al. | 358/181 |

Primary Examiner—Robert L. Richardson
Assistant Examiner—Edward L. Coles
Attorney, Agent, or Firm—Weinstein & Sutton

[57] ABSTRACT

A solid state switch assembly for selectively coupling a TV monitor to one of a plurality of TV cameras. A random access memory is utilized to establish the switching sequence. The switch is advanced through the desired sequence by activating an oscillator to step a counter. The counter output addresses each memory location and the state of the addressed memory location controls either a termination or a continuation of the switching sequence. The counter output also sets an analog type switch for selecting one of the plurality of video inputs to be coupled to one or more of the video monitors. The system is capable of displaying the selected video input signal on a plurality of monitors through the use of impedance matched current amplifiers. A biasing circuit is provided to allow the switch to handle signals making positive signal excursions above the system ground without interference with the positive voltage supply. Switching circuitry is provided at each monitor position for application of a negative holding signal to a hold sensing circuit through the coaxial cable connection between the camera and the monitor to thereby deenergize the aforesaid oscillator. Impedances are provided to prevent the video signals from being shorted out as a result of operation of the local hold buttons for the monitors so as not to degrade the scene being displayed.

22 Claims, 3 Drawing Figures

SWITCHING APPARATUS FOR CLOSED CIRCUIT TELEVISION MONITORING SYSTEMS

BACKGROUND OF THE INVENTION

Factories, office buildings, educational institutions and the like typically employ monitoring systems for surveillance and security purposes. Such systems are typically comprised of a closed circuit television network having a plurality of television cameras each arranged to view a particular location. In order to avoid the complexity and cost of providing one TV monitor per TV camera, switchers have been employed to affect the switching of a single TV monitor sequentially from one TV camera to the next, so that an observer need only look at a single TV monitor, which monitor is connected in sequence to each of the TV cameras. Whenever it is unnecessary to observe one or more particular locations being monitored by associated TV cameras, a selector switch on the switcher apparatus allows said location or locations to be "skipped". Likewise, the monitor may also be "held" so that the region being observed by that camera is constantly displayed on the monitor until it is desired to advance to the next observation location.

Conventional switchers have employed discrete rather than integrated semiconductor devices. The circuitry employed for skipping or holding a TV camera has involved rather tedious and complex construction techniques requiring at least one switch per TV camera position, thus, significantly adding to construction costs and maintenance requirements due to the fact that deterioration of switch contacts has become a troublesome aspect of the system.

In addition to the above, present day switchers have been found to have other design limitations. For example, the devices employed for electronic switching in conventional apparatus have made the switcher a "passive" part of the video circuit, causing the TV camera signals to be attenuated by the switcher, rendering it difficult, if not impossible, to drive more than one monitor even though the ability to monitor one TV camera in a plurality of different locations is a most desirable feature. As a result, it became necessary to provide separate amplifying devices for each such location. In addition to the above, since all of the controls such as the "hold" and the "skip" controls of the switcher are arranged on the switcher itself, the TV monitor which is located remote from the switcher is only of limited use since the person observing the remote monitor does not have the ability to operate the switcher to the "hold" condition should he desire to "hold" one particular TV camera. Thus present day systems would be more versatile if each remote monitor were provided with a "hold" switch allowing a selection of a particular TV camera from any monitor in the system.

Conventional switchers have the further limitation of requiring a lighted indicator at each switcher position making observation inconvenient, if not difficult, in low light conditions, since the non-illuminated designating numeral for the particular camera switched into the circuit is not readily apparent, requiring that ambient light be significantly increased in order to be able to observe the camera designation number next to the lighted indicator. These disadvantages lead to a rather tedious and complex switcher assembly.

BRIEF DESCRIPTION OF THE INVENTION

The present invention is characterized by providing a novel solid state switcher assembly which is designed to overcome all of the disadvantageous features of conventional switchers as have been described hereinabove and provides further novel features which serve to increase the usefulness, convenience and versatility of the switcher through circuitry of a greatly simplified design yielding a significant decrease in maintenance requirements. The switcher of the present invention utilizes integrated circuits which further reduce construction costs as well as the number of discrete components required per system. An illuminated alphanumeric readout is provided for indicating the "active" TV camera at any given time and the large number of switches required in conventional systems to perform the "hold" and the "skip" functions have been completely eliminated and replaced by a total of only three switches, said reduction being made possible through the use of solid state random access memory means.

The system is comprised of solid state analog switch means adapted to connect any one of a plurality of video input lines to a TV monitor through impedance matching current amplification means. The switch condition of the analog switch is controlled by binary counter means advanced by oscillator means capable of operating at at least two separate frequencies. The output of the counter is further coupled to an alphanumeric display and said memory means as well as said analog switch means.

The output of the counter means determines which of the analog switch inputs is coupled to its output.

The oscillator means steps the counter, whose lowest frequency component determines the dwell time at each TV camera position of the switcher. The counter, which is preferably a down counter, simultaneously controls the switching state of the analog switch, the display state of the alphanumeric display and the address to the memory. The binary data stored at the memory location selected by the counter means determines the switching sequence. For example, a "skip" condition may be stored in memory, conditions the oscillator to operate at a higher frequency which is preferably several orders of magnitude greater than the normal operating frequency, having the effect of causing the counter to be advanced at a rapid rate thus yielding the effect of "skipping" a particular TV camera location.

A "hold" capability is provided at the switcher which serves to terminate oscillation of the oscillator means for as long as it is desired to observe the switched in TV camera. The "hold" capability is also provided at each remote monitor location whereby the observer of said remote location need only operate "hold" switch means to terminate the scanning sequence for a period equal to the time that the "hold" condition is maintained. The "hold" signal is applied directly through the coaxial cable connection between the TV monitor and the analog switch means, totally eliminating the need for separate wiring means between the "hold" switch and the "hold" sensing circuit and including circuit means to prevent the "hold" switch means arranged at the remote monitor from degrading the television picture due to its operation.

The analog switch employed to selectively couple one of the TV inputs to a TV monitor is provided with impedance matching current amplifying means as well as biasing means to enable the analog switch means to handle signals making positive excursions relative to system chassis ground without interfering with the positive voltage supply source for the system.

OBJECTS OF THE INVENTION AND BRIEF DESCRIPTION OF THE FIGURES

It is therefore one object of the present invention to provide novel solid state switch means for closed circuit TV systems and the like and which utilizes memory means to control switching, thereby significantly reducing the number of operating switches employed in the system.

Still another object of the present invention is to provide novel solid state switch means for use with closed circuit TV systems and the like in which the switching sequence is activated by memory controlled oscillator means.

Still another object of the present invention is to provide oscillator controlled counter means for simultaneously controlling the operation of analog switch means and sequence controlling memory means.

Still another object of the present invention is to provide a novel solid state switch means of integrated circuit design and incorporating alphanumeric display means controlled by counter means in conjunction with analog switch means and sequence controlling memory means.

Still another object of the present invention is to provide novel hold means at remote monitors provided within a closed circuit TV system in which the coaxial cable connections conventionally provided are utilized to transmit "hold" signals without any degradation of the video signals being transmitted.

Still another object of the present invention is to provide novel solid state switching means of the integrated circuit type and incorporating analog switch means and power supply means having bias means to enable video signals transmitted by the analog switch means to undergo positive excursions without interfering with the system power supply.

Still another object of the present invention is to provide novel solid state switch means of the integrated circuit type for use in closed circuit TV systems and the like and utilizing memory means capable of storing switching sequence data to provide any desired sequence of switching operations including selective "skipping" of any of the TV camera locations.

The above as well as other objects of the present invention will become apparent from a consideration of a detailed description of the drawings, in which.

DETAILED DESCRIPTION OF THE INVENTION

Figure 1:
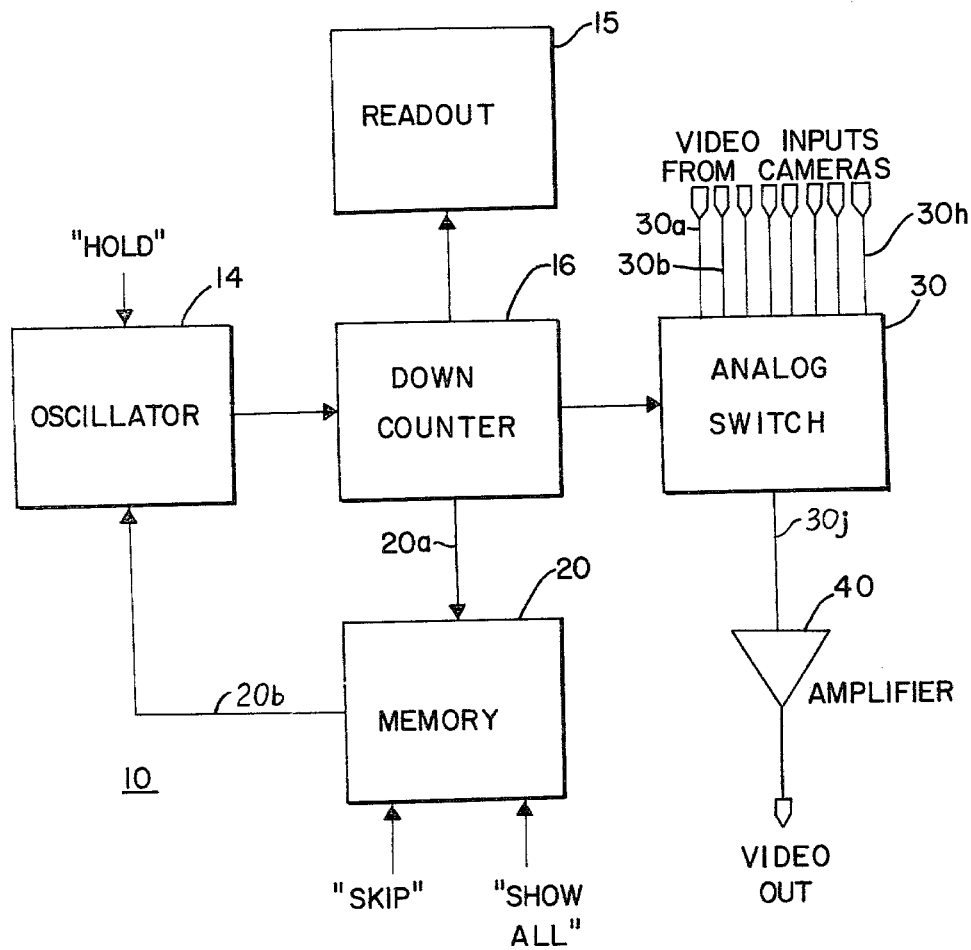
FIG. 1 is a block diagram showing a switching system designed in accordance with the principles of the present invention.

FIG. 1 shows a block diagram of a switcher system 10 designed in accordance with the principles of the present invention and illustrating the major functional blocks of the system which is comprised of an oscillator 14 adapted to generate a train of pulses that drives down counter 16. The lowest frequency component of down counter 16 determines the dwell time for each camera position of the switcher, i.e., determines how long the picture from each TV camera is displayed on the monitor. For example, assuming the oscillator 14 has an operating frequency of 1kHz and assuming the down counter 16 is a binary counter having 10 bistable stages, then the total number of combinations possible would be 1,024 and each combination would have a dwell time of the order of 1.024 seconds. Obviously, a longer dwell time may be obtained by adding additional stages to the down counter. For example, by adding two more stages, the dwell time may be increased to almost 4.1 seconds. As will be understood hereinbelow, the actual number of switch positions employed is significantly less than the total number of switch positions (i.e. combinations) available.

Down counter 16 simultaneously drives digital type alphanumeric readout 15, random access memory 20 and analog switch 30. The output stages selected from the down counter are identical for driving all three devices 15, 20 and 30 so that the display presented by readout means 15 corresponds to the memory location addressed by down counter 16, and so that the display presented represents that video input of analog switch 30 which is coupled to output 30j. Similarly, the selected video input is identified by said memory address and is represented by the alphanumeric display presented by readout 15.

The memory 20 provides either one of two binary levels at its common output 20b, which binary level is applied to oscillator 14. Memory 20 speeds up the operating frequency of oscillator 14 by several orders of magnitude whenever the address in memory selected by down counter 16 identifies a TV camera station which memory 20 has been programmed to "skip", which operation will be described in more detail hereinbelow. The increase in operating frequency of oscillator 14 causes such a rapid increase in switching rate as to have the same effect as skipping a station. Memory 20 may be programmed to skip one or more stations or to display all stations in accordance with the dwell time determined by the lowest frequency component of down counter 16.

Figure 2:
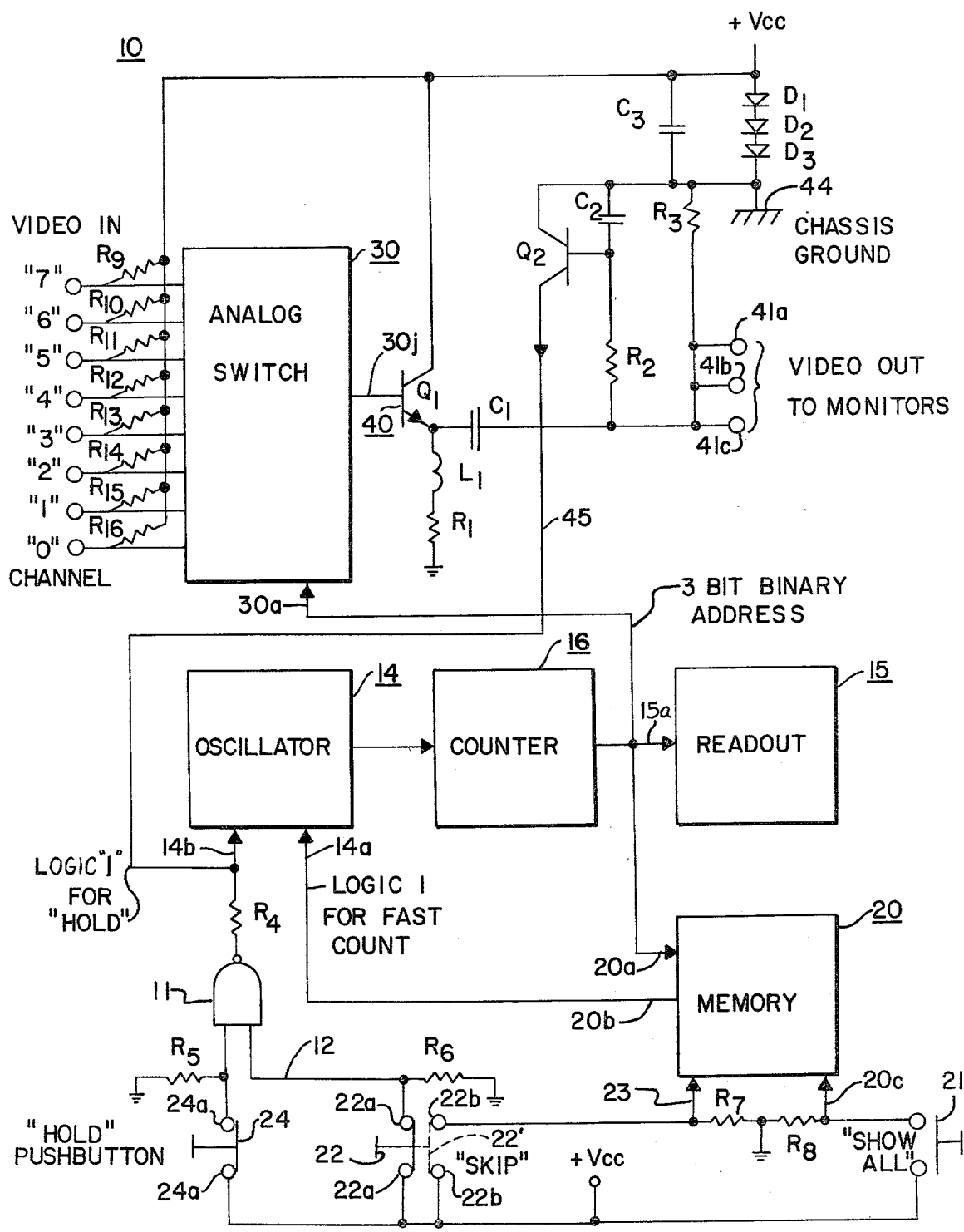
FIG. 2 shows the switching system of FIG. 1 in which certain components thereof are shown in greater detail to facilitate a better understanding of the invention.

In one practical embodiment as shown in FIG. 2, the analog switch means 30 is an eight position analog switch capable of selecting any of its inputs 30a–30h for connection to its output 30j. Amplifier 40 provides sufficient amplification for the system 10 to enable the selected TV camera to simultaneously drive several TV monitors.

FIG. 2 shows the switcher system of the present invention in greater detail wherein oscillator 14 is adapted to generate a series of pulses counted by down counter 16. For the example given, i.e., for an eight position analog switch 30, a three bit binary address is developed by counter 16 to accommodate the eight position switch capacity.

The three bit binary address appearing at the output of counter 16 simultaneously addresses alphanumeric readout 15 at input 15a; memory 20 at input 20a and analog switch 30 at input 30a.

Memory 20 may be any suitable memory, for example, of the random access type and having a capacity of at least eight storage locations, each storage location being capable of storing at least one binary bit. The three bit address applied to the input 20a of memory 20 causes the binary content of the selected address location to appear at common output 20b of memory 20. This logic condition is applied to the frequency control input terminal 14a of oscillator 14. For example, when a logic 1 appears in the location whose address has been selected by counter 16, the logic 1 level causes the frequency of oscillator 14 to increase by several orders of magnitude to thereby dramatically increase the switching rate, having the effect of skipping that particular station. In other words, the switching rate is so dramatically increased that the switching of the selected TV camera is performed so rapidly as to give the impression that the selected TV camera has been "skipped".

A "show all" pushbutton 21 resets the entire contents stored in memory so that the outputs for all eight switch positions will be at logic zero to prevent the switcher from skipping any stations. As can be seen from FIG. 2, the memory reset input 20c is normally maintained at power supply ground potential, being coupled thereto through resistor $R_8$. By closing normally-open "show all" pushbutton 21, +Vcc is coupled through switch 21 to the reset input 20c to reset the contents of all memory locations to logic zero. Thereafter, as each memory location is addressed by counter 16, each memory location reads out a logic zero condition which is applied to frequency control input 14a to cause the oscillator 14 to operate at the normal (lower) operating frequency whereby each TV camera is sequentially coupled to the video monitors for the full aforementioned dwell time.

Memory 20 may be programmed to skip any one of the TV cameras by operation of "skip" pushbutton 22. FIG. 2 shows switch 22 in its normal position whereby +Vcc is coupled in common to one terminal of resistor $R_6$ and one input of NAND gate 11. It should be understood that suitable bias means (not shown) such as for example a biasing spring, may be provided to normally maintain pushbutton 22 in the solid line position shown in FIG. 2. When the arm of pushbutton 22 bridges contacts 22a, 22a, a logic 1 is applied to one input terminal of NAND gate 11. The remaining input of NAND gate 11 is normally maintained at logic 1 due to the normally-closed position of "hold" pushbutton 24 which, by providing suitable resilient bias means (not shown) has its movable contact bridging stationary contacts 24a, 24a to apply +Vcc (i.e. logic 1) to the associated input of NAND gate 11.

When logic 1 is applied to both inputs of NAND gate 11, the output of NAND gate 11 is maintained at logic zero. Thus logic zero level is applied to the operation control input 14b of oscillator 14 allowing the oscillator to continue operation at a frequency rate determined by the logic level applied to input 14a.

In order to perform a "skip" operation, pushbutton 22 is moved to the dotted line position 22'. Before bridging contacts 22b—22b, movable switch arm 22 is first disengaged from stationary contacts 22a—22a to remove the logic 1 from the associated input of NAND gate 11, thereby changing the input to a logic zero. This causes the output of NAND gate 11 to immediately shift to a logic 1 level which abruptly terminates the operation of oscillator 14, regardless of the binary level applied to input 14a.

Subsequent thereto, the movable arm of pushbutton 22 bridges contacts 22b—22b to apply a logic 1 at memory load input 23. This binary condition is loaded into the memory location established by the three bit address appearing at the output of counter 16. This address is the same as that appearing at the output of counter 16 at the time that pushbutton 22 is depressed. A "skip" condition is now stored at said memory location. By having pushbutton 22 initially terminate the operation of oscillator 14 before loading memory 20, this prevents the possibility of programming a "skip" condition for two or more successive positions, in the event that pushbutton 22 is depressed at the instant that the switcher would sequence from one station to the next. By releasing pushbutton 22 to again bridge contacts 22a, 22a, oscillator 14 is energized and the logic one just stored in memory 20 appears at common output 20b to operate oscillator 14 at the higher frequency rate to "skip" the TV camera presently being displayed.

In the event that it is desired to perform a "hold" operation in an effort to retain a particular TV camera in the switched-on position, hold button 24 is depressed to remove the logic 1 condition from the associated input of NAND gate 11 and replace this condition with a logic zero condition, through resistor $R_5$, causing the output of NAND gate 11 to go to logic 1 and thereby turn off oscillator 14. The output of counter 16 cannot change at this time. This condition remains for as long as "hold" pushbutton 24 remains depressed.

Analog switch 30 is shown as being provided with eight inputs, one for each of the channels "zero" through "seven", said inputs each being terminated to chassis ground through impedance matching resistors $R_9$-$R_{16}$ respectively. The impedance matching resistors make the analog switch compatible with the characteristic impedance of the coaxial cable employed in the closed circuit TV system for coupling the TV camera outputs to the inputs of analog switch 30. The three bit binary address appearing at the output of counter 16 is applied to selection control inputs 30a. Although not shown for purposes of simplicity, it should be understood that three such inputs are provided to select any one of the eight input lines "zero" through "seven". Depending upon the three bit binary code presented to selection control inputs 30a, the selected input line is coupled to output line 30j which, in turn is coupled to the base electrode of transistor $Q_1$ which is connected in emitter-follower fashion to provide current amplification of the incoming video signal. DC loading of transistor amplifier 40 is provided through resistor $R_1$ connected to ground. Inductor $L_1$ improves the high frequency response of the circuit in order to obtain sharp monitor images. The current amplified output signal is taken from the emitter electrode of transistor $Q_1$. Capacitor $C_1$ provides DC isolation so that the video output terminals 41a-41c are DC biased at chassis ground 44 through resistor $R_3$. As shown, three video monitors may be coupled to the selected video input line. If desired, a greater or lesser number of TV monitors may be accommodated by the switcher system 10.

In order to operate the switcher circuitry from a single voltage supply and in order to reference video input and output signals to chassis ground 44, a biasing arrangement is provided, which arrangement is comprised of forward biased diodes $D_1$, $D_2$ and $D_3$ connected in series fashion between supply source +Vcc and chassis ground 44. A capacitor $C_3$ is connected in parallel across series connected diodes $D_1$-$D_3$. This biasing circuit enables analog switch 30 to allow the video input signals to undergo positive signal excursions above chassis ground without interference with positive voltage supply +Vcc.

Whenever it is desired to hold a particular switcher position, a negative DC potential of approximately one (1) volt is applied at the selected output terminal 41a–41c from a remote monitor. The application of this negative signal level is applied to the base electrode of transistor $Q_2$ through resistor $R_2$ to render the transistor $Q_2$ conductive. Capacitor $C_2$ will only conduct for average DC potentials appearing at output terminal 41 and thus filters out video signals. Thereby, when the negative DC voltage is applied at one of the output terminals 41a–41c, transistor $Q_2$ conducts to apply a logic one (chassis ground) to control input 14b of oscillator 14 which is coupled to the collector of $Q_2$ through lead 45. This logic one level terminates the operation of oscillator 14 for as long as the negative voltage level appears at the base electrode of $Q_2$ causing the TV camera presently switched in circuit with the output 30b of analog switch 30 to remain in the switched on position.

Figure 3:
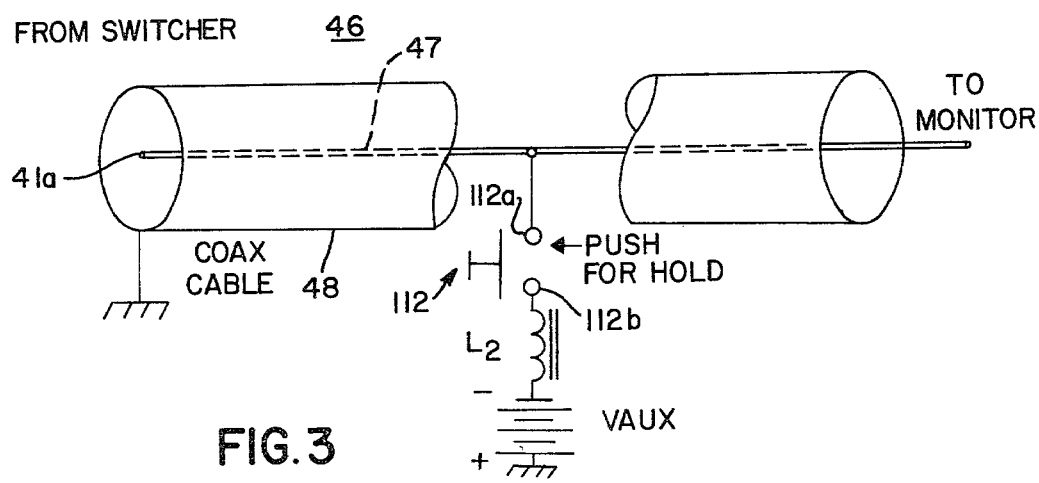
FIG. 3 shows a detailed schematic view of the manner in which remote "hold" signals are conveyed through the coaxial cable extending between the individual monitors and the analog switch means, and without degrading the TV picture.

FIG. 3 shows the circuit employed for holding a particular position from a remote monitor. Each of the outputs 41a–41c (FIG. 2) is coupled through a coaxial cable, such as coaxial cable 46 in FIG. 3, comprised of a central conductor 47 coaxial with and surrounded by a conductive sheath or sleeve 48. The left-hand end of the coaxial cable is coupled to a selected one of the monitor outputs 41a–41c, such as for example output 41a, and is coupled to a TV monitor (not shown for purposes of simplicity). A remote monitor hold switch 112 is provided with suitable resilient biasing means (not shown) so as to be normally disengaged from stationary contacts 112a, 112b. Contact 112b is coupled to ground through series connected inductor $L_2$ and a source of negative DC potential $V_{AUX}$, having an output preferably on the order of one volt. By depressing remote monitor hold switch 112, a negative DC level is applied to the signal conductor 47 of the coaxial cable 46 causing the signal conductor to be biased negatively with respect to the chassis ground 44 of the video switcher and video circuit by source $V_{AUX}$ which, for example, may be a battery pack. The negative voltage causes transistor $Q_2$ to conduct in the same manner as was previously described in order to deenergize oscillator 14.

Source $V_{AUX}$ is typically a three-volt battery to assure reliable operation of the circuit. Inductor $L_2$ provides a high impedance for the video signals carried by signal conductor 47 of coaxial cable 46, yet provides a low impedance conduction path for the DC battery potential. This arrangement allows pushbutton 112 to be depressed without degrading the strength of the video signal carried by coaxial cable 46. This arrangement thereby enables the hold control signal to be "piggybacked" directly upon the coaxial cable signal thus totally eliminating the need for separate wiring between the hold switch 112 of each TV monitor and the sensing device $Q_2$ of the switching system.

In the preferred embodiment, the analog switch 30 may, for example, be an MC14051; down counter 16 may for example be an MC14161; memory 20 may for example be an MC14599; and oscillator 14 may for example be an MC14541. The readout 15 may for example be a segmented type of numeric digital display such as for example MAN6680. All of the aforesaid integrated circuits are products of the Motorola Corporation.

A latitude of modification, change and substitution is intended in the foregoing disclosure and, in some instances, some features of the invention will be employed without a corresponding use of other features. Accordingly, it is in a manner consistent with the spirit and scope of the invention herein.

What is claimed is:

1. A switcher for closed circuit TV systems employed for surveillance, security and the like, comprising:
   switch means having a plurality of inputs each being designed for connection to a television camera and a common output designed for connection with a television monitor and including switch control means responsive to a predetermined multibit input for selecting that one of said plurality of inputs which is to be connected to said common output;
   pulse generating means;
   multistage register means responsive to pulses developed by said generator means for altering the contents of said register to develop multibit control signals for application to said switch control means;
   memory means having a plurality of address locations for storing switching control data, said memory means having an output and means for coupling the switching control data located at the address represented by the control signals developed by said register means to said output; and
   pulse generating means including altering means responsive to said switching control data for altering the operating rate of the pulse generating means in accordance with the switching control data present at said output.

2. The switcher of claim 1, wherein said pulse generating altering means includes frequency altering means responsive to the state of the switching control data for altering the rate at which pulse signals are applied to said register means.

3. The switcher of claim 1, wherein said pulse generator means comprises an oscillator and said altering means for altering the pulse rate comprises means for changing the operating frequency of said oscillator responsive to the switching control data derived from said memory means.

4. The switcher of claim 1, wherein said register comprises a multistage binary counter.

5. The switcher of claim 1, wherein said register comprises a multistage binary down counter.

6. The switcher of claim 1, further comprising numeric display means coupled to said register for displaying a numeric value representative of the input of said switch means coupled to the common output of said switch means.

7. The switcher of claim 1, further comprising normally open reset switch means;
   said memory means including means responsive to said reset switch means to cancel all skip conditions stored in said memory means responsive to closing of said reset switch means.

8. The switcher of claim 1, further comprising hold switch means;
   means responsive to operation of said hold switch means to terminate the operation of said pulse generating means so long as said hold switch means is maintained in the "hold" condition.

9. The switcher of claim 1, further comprising hold switch means and skip switch means; logic gate means responsive to either said hold switch means or said skip switch means for terminating the operation of said pulse generating means when either of said hold or skip switch means is operated and for maintaining said oscillator means in the off state so long as either of the aforesaid hold switch means and skip switch means remain depressed; said logic gate means maintaining said oscillator energized when neither of said hold and skip switch means is operated.

10. The switcher of claim 1, wherein said switch means comprises an analog switch having a plurality of inputs; impedance matching means coupled between each of said inputs and a ground reference for matching the input impedance of said analog switch means to the characteristic impedance of the television transmission line coupling each TV camera to an associated one of said analog switch inputs.

11. The switcher of claim 10, further including a power supply means;
bias means coupled between said power supply means and ground reference of said system to enable video signals making positive excursions above ground reference to be handled without interference with said power supply means.

12. The switcher of claim 11, wherein said biasing arrangement comprises a plurality of diodes connected in series and in a forward conducting direction between said power source and reference potential; capacitor means coupled in parallel across said series connected diodes.

13. The switcher of claim 1, wherein said switch means comprises an analog switch.

14. The switcher of claim 13, further comprising coaxial cable means for coupling video signals appearing at the output of said analog switch means to a TV monitor;
remote hold switch means positioned adjacent said TV monitor and being coupled to said coaxial cable means;
a DC signal generating means and impedance means coupling said DC signal generating means to said switch means for providing a high impedance for video signals when said hold switch means is closed to allow operation of said hold switch means without interfering with the signal strength of the video signal;
means coupled to said coaxial cable means and responsive to said DC signal for terminating the operation of said pulse generating means for as long as said DC signal persists.

15. The switcher of claim 13, further comprising current amplifier means coupled to the output of said analog switch common output to amplify the video signal to the suitable level.

16. The switcher of claim 15, further comprising impedence means coupled between the output of said current amplifying means and a reference potential for improving the high frequency response of the circuit for sharp TV images.

17. The switcher of claim 15, further comprising sensing means coupled between the common output of said analog switch means and said reference potential for generating a hold signal whenever an average DC level is applied between the output of said current amplifying means and ground reference;
said hold sensing means further comprising circuit means rendering said hold signal sensing means immune from activation by video signals.

18. The switcher of claim 16, comprising a resistor and a capacitor connected in series between the output of said current amplifying means and reference potential;
said video output signal being taken from the common terminal between said resistor and capacitor elements.

19. The switcher of claim 17, further comprising hold switch means for generating a DC level to operate said sensing means.

20. The switcher of claim 1, further comprising a skip selecting switch means;
means responsive to said skip selecting switch means for halting said pulse generating means and for storing a "skip" switching data condition in the address location in memory means presently being developed by said register means at the time that the operation of said oscillator means is terminated.

21. The switcher of claim 20, wherein said means responsive to said skip selecting switch means comprises a switch having first and second contact pairs and a movable member;
said movable member being normally biased to engage said first contact pair and to be disengaged from said second contact pair;
said movable member being movable in a first direction toward engagement with said second contact pair whereby said switch is initially disengaged from said first contact pair before engaging said second contact pair;
said first and second contact pairs being respectively coupled to said pulse generating means and said memory means whereby operation of said pulse generating means is halted before the memory state of the memory location coupled to said second contact pair is altered.

22. A switcher for closed circuit TV systems employed for surveillance, security and the like, comprising:
switch means having a plurality of inputs each being designed for connection to a television camera and a common output designed for connection with a television monitor and including switch control means responsive to a predetermined multibit input for selecting that one of said plurality of inputs which is to be connected to said common output;
pulse generating means;
multistage register means responsive to pulses developed by said generator means for altering the contents of said register to develop multibit control signals for application to said switch control means;
digital display means coupled to said register means for generating a numeric display representing the input of the switch means presently coupled to the output of the switch means.

* * * * *

UNITED STATES PATENT AND TRADEMARK OFFICE
CERTIFICATE OF CORRECTION

PATENT NO. : 4,308,559
DATED : December 29, 1981
INVENTOR(S) : Schiff, Peter

It is certified that error appears in the above—identified patent and that said Letters Patent is hereby corrected as shown below:

In the Claims:

Col. 8, line 27, insert "said" before the word --pulse--.

Signed and Sealed this

Third Day of May 1983

[SEAL]

Attest:

GERALD J. MOSSINGHOFF

Attesting Officer   Commissioner of Patents and Trademarks